(12) United States Patent
Montgomery et al.

(10) Patent No.: US 7,987,974 B2
(45) Date of Patent: Aug. 2, 2011

(54) BUTTONLESS CONVEYOR BELT

(75) Inventors: Jack Montgomery, Winchester, VA (US); Craig Musselman, Front Royal, VA (US); Joseph Fout, Augusta, WV (US); Paul Steinhoff, Stephens City, VA (US)

(73) Assignee: Ashworth Brothers, Inc., Winchester, VA (US)

( * ) Notice: Subject to any disclaimer, the term of this patent is extended or adjusted under 35 U.S.C. 154(b) by 0 days.

(21) Appl. No.: 12/789,806

(22) Filed: May 28, 2010

(65) Prior Publication Data

US 2010/0236902 A1 Sep. 23, 2010

Related U.S. Application Data

(63) Continuation of application No. 11/622,323, filed on Jan. 11, 2007, now Pat. No. 7,735,637.

(51) Int. Cl.
*B65G 17/38* (2006.01)
*B65G 15/10* (2006.01)
*B65G 15/02* (2006.01)
*B65G 21/06* (2006.01)
*B65G 17/06* (2006.01)
*B65G 21/00* (2006.01)

(52) U.S. Cl. ........ 198/853; 198/849; 198/817; 198/831; 198/850

(58) Field of Classification Search ................. 198/849, 198/817, 831, 850, 853
See application file for complete search history.

(56) References Cited

U.S. PATENT DOCUMENTS

| 1,250,881 | A | | 12/1917 | Hodges | |
|---|---|---|---|---|---|
| 3,991,876 | A | * | 11/1976 | Schmidt et al. | 198/831 |
| 4,078,655 | A | | 3/1978 | Roinestad | |
| 4,742,907 | A | | 5/1988 | Palmaer | |
| 4,957,597 | A | * | 9/1990 | Irwin | 198/831 |
| 4,971,191 | A | | 11/1990 | Lapeyre | |
| 5,566,817 | A | | 10/1996 | Meeker | |
| 5,954,187 | A | * | 9/1999 | Hager | 198/778 |
| 5,954,188 | A | | 9/1999 | Etherington et al. | |
| 6,070,715 | A | | 6/2000 | Etherington et al. | |
| 6,073,756 | A | | 6/2000 | Damkjaer et al. | |
| 6,360,882 | B1 | | 3/2002 | Maine, Jr. et al. | |
| 6,371,284 | B1 | * | 4/2002 | Pasch | 198/848 |
| 6,374,988 | B1 | | 4/2002 | McLaughlin et al. | |
| 7,735,637 | B2 | | 6/2010 | Montgomery et al. | |

(Continued)

FOREIGN PATENT DOCUMENTS

EP 1498367 1/2005

(Continued)

OTHER PUBLICATIONS

Application as filed on Jan. 11, 2007 in U.S. Appl. No. 11/622,323.

(Continued)

*Primary Examiner* — Gene Crawford
*Assistant Examiner* — Yolanda Cumbess
(74) *Attorney, Agent, or Firm* — Plumsea Law Group, LLC

(57) ABSTRACT

A conveyor belt is made with a series of spaced apart buttonless rods. The buttonless rods are connected to each other with a plurality of links. The buttonless ends of the rods are welded or otherwise affixed to the links so that the ends of the rods are substantially coplanar with the outer surface of the links. This forms a relatively smooth link surface, which is readily cleaned and sanitized. Additionally, wear and tear is reduced on driving grip surfaces that frictionally grab onto the links.

28 Claims, 10 Drawing Sheets

U.S. PATENT DOCUMENTS

2005/0126895 A1  6/2005  Layne et al.
2007/0175738 A1  8/2007  Neely et al.

FOREIGN PATENT DOCUMENTS

GB  1603403  11/1981

OTHER PUBLICATIONS

Information Disclosure Statement filed on Jun. 25, 2007 in U.S. Appl. No. 11/622,323.
Information Disclosure Statement filed on Aug. 20, 2008 in U.S. Appl. No. 11/622,323.
Office Action mailed Sep. 18, 2008 in U.S. Appl. No. 11/622,323.
Response to Office Action filed on Nov. 26, 2008 in U.S. Appl. No. 11/622,323.
Notice of Allowance mailed Jan. 2, 2009 in U.S. Appl. No. 11/622,323.
Office Action mailed Mar. 18, 2009 in U.S. Appl. No. 11/622,323.
Response to Office Action filed on Jun. 18, 2009 in U.S. Appl. No. 11/622,323.
Information Disclosure Statement filed on Aug. 5, 2009 in U.S. Appl. No. 11/622,323.
Final Office Action mailed on Oct. 14, 2009 in U.S. Appl. No. 11/622,323.
Response to Final Office Action filed Jan. 12, 2010 in U.S. Appl. No. 11/622,323.
Notice of Allowance mailed Feb. 1, 2010 in U.S. Appl. No. 11/622,323.
PCT International Search Report mailed Aug. 14, 2008 from PCT Application No. PCT/US2008/050727.
International Preliminary Report on Patentability, mailed Jul. 23, 2009, from PCT Application No. PCT/US2008/050727.
Australian Office Action mailed Jul. 7, 2010 in Australian Patent Application No. 2008206516.
Response to Australian Office Action filed Oct. 25, 2010 in Australian Patent Application No. 2008206516.

* cited by examiner

//]: #

BUTTONLESS CONVEYOR BELT

CROSS-REFERENCE TO RELATED APPLICATION

This application is a continuation of U.S. application Ser. No. 11/622,323, entitled "Buttonless Conveyor Belt", filed on Jan. 11, 2007, and allowed on Feb. 1, 2010, which patent application is hereby incorporated by reference in its entirety.

BACKGROUND OF THE INVENTION

1. Field of the Invention

The present invention relates generally to conveyor belts made from a plurality of longitudinally spaced rods coupled with interlocking links. More particularly, the present invention relates to conveyor belts utilizing buttonless rods.

2. Description of Related Art

Conveyor belts are popularly used in a number of different industrial fields to provide continuous motion of goods during manufacture, shipping, and other processes. Industrial conveyor belts generally include a series of spaced apart rods connected via a series of interlocking links which are welded to the rods. For the manufacture of small items, the rods may be covered with a fabric, plastic, or metal overlay, such as a mesh, to prevent the small items from slipping between the rods and falling to the manufacturing floor. A typical conveyor belt 10 is shown in FIG. 1, which corresponds to FIG. 1 of U.S. Pat. No. 5,954,188, which is incorporated herein by reference. Conveyor belt 10 includes rods 20 connected by links 22 covered by a mesh 14. A buttonhead 32 is formed on the ends of rods 20 to act as a stop for links 22. A weld is also typically formed between buttonhead 32 and link 22 for a stronger and more secure connection between rods 20 and links 22.

The buttonhead configuration on the ends of the rods of a conveyor belt can create challenges in maintaining the conveyor belt and associated equipment. For example, if a conveyor belt is subjected to a curvy path, the conveyor belt is driven around a curve via friction between the edge of the conveyor belt and a driving belt. The driving belt includes a grip surface which frictionally grasps the sides of the links of the conveyor belt to force the conveyor belt to follow the path of the curve. Such grip surfaces are typically made from materials such as plastics or rubber. Because the rod buttonheads protrude significantly from the outer surface of the link, the grip surface is not able to cleanly grab onto the flat surface of the leg of the link. The buttonheads also abrade the grip surface as the buttonheads move over the grip surface. Over time the grip surfaces of the driving belt are worn and damaged by the buttonheads more quickly than if the driving belt were to contact the leg of the link or a lower profile rod end. Therefore, having a conveyor belt without buttonheads could reduce wear on the driving surface.

Furthermore, in the manufacture of food products, the ability to clean equipment is an issue of paramount importance, so that the manufacturing plant remains sanitary so as not to contaminate the food products. In order to be able to clean a conveyor belt effectively, the number of small crevices and protrusions on the belt capable of trapping food are preferably minimized. As shown in FIGS. 1 and 2, the protrusion of buttonhead 32 from the outer surface of link 22 creates a point for the accumulation of debris. While weld material may be used to fill the space between buttonhead 32 and link 22, welds are typically bridge welds and formed only over a portion of buttonhead 32. As such, a buttonhead configuration increases the difficulty of maintaining a properly sanitized manufacturing system. Therefore, eliminating the buttonhead from the conveyor belt design would be advantageous in the long-term ability to keep the conveyor belt properly cleaned.

Additionally, while the buttonhead is useful during manufacturing by acting as a natural stop for links prior to welding the links in position, forming the buttonhead on the ends of the rods may actually result in increased manufacturing time. Rods are typically elongated steel members having ends of uniform diameter so that the links may slide easily onto the ends of the rods. To form the buttonhead, typically an electrode is touched to the end of the rod. The electrodes apply energy sufficient to melt and deform the end of the rod into the bulbous buttonhead. The melting of the rod material in this fashion releases carbon from the steel which accumulates on the buttonhead. The next processing step in the manufacture of the conveyor belt should be to weld the buttonhead to the side of the link. However, the carbon residue inhibits a good weld between the buttonhead and the link. Therefore, the carbon residue is generally cleaned off of the buttonhead prior to welding, for example with an acid bath. Eliminating the processing steps of forming the buttonhead and cleaning the buttonhead could provide significant savings in manufacturing time and complexity.

Therefore, there exists a need in the art for rod-and-link conveyor belts made without buttonheads.

SUMMARY OF THE INVENTION

In one aspect, the invention provides a conveyor belt comprising a plurality of spaced apart buttonless rods, a plurality of links connecting the buttonless rods. Each link is configured to receive a first rod end of a first rod through a circular aperture formed in the link, with the first rod end being affixed to an outer surface of the link.

In another aspect, each link is configured to receive a second rod end of a second rod through an elongated aperture formed in the link.

In another aspect, each of the plurality of links is generally U-shaped.

In another aspect, the first rod end is affixed to the outer surface of the link by welding.

In another aspect, additional weld material is applied to the first rod end and the outer surface of the link to secure the first rod end to the link.

In another aspect, the first rod end is melted to secure the first rod end to the link.

In another aspect, the first rod end is substantially coplanar with the outer surface of the link.

In another aspect, the first rod end is flush with the outer surface of the link.

In another aspect, the first rod end protrudes from the outer surface of the link.

In another aspect, the first rod end is recessed within the circular aperture of the link.

In another aspect, additional weld material surrounds the first rod within the circular aperture.

In another aspect, the invention provides a conveyor belt comprising a first buttonless rod spaced apart from a second buttonless rod, with each buttonless rod having a right end and a left end. A right link connects the right end of the first rod to the right end of the second rod, with the right end of the first rod being inserted into a circular aperture formed in the right link and the right end of the second rod being inserted to an elongated aperture formed in the right link. A left link connects the left end of the first rod to the left end of the second rod, with the left end of the first rod being inserted into a circular aperture formed in the left link and the left end of the second rod being inserted to an elongated aperture formed in the left link. The first rod is affixed to a first outer surface of the right link and to a second outer surface of the left link; and at least one of the right end of the first rod is substantially coplanar with the first outer surface or the left end of the first rod is substantially coplanar with the second outer surface.

In another aspect, the right link and the left link each have a general U-shape.

In another aspect, the right link and the left link have side-to-side symmetry.

In another aspect, the first buttonless rod is affixed to the right link and to the left link by welding in at least one weld location.

In another aspect, the at least one weld location substantially covers at least one of the right end of the first rod or the left end of the first rod.

In another aspect, the invention provides a method for making a buttonless conveyor belt comprising the steps of: (i) providing a rod on a manufacturing surface; (ii) providing a first link configured to receive a first end of the rod on a first side of the manufacturing surface; (iii) providing a second link configured to receive a second end of the rod on a second side of the manufacturing surface, the second link being spaced apart from the first link approximately a length of the rod; (iv) offsetting the first link and the second link in a manufacturing direction; (v) aligning the first end of the rod with the first link; (vi) inserting the first end of the rod through the first link far enough to provide clearance between a second end of the rod and the second link; (vii) aligning the rod with the second link by advancing the rod in the manufacturing direction; (viii) inserting the second end of the first elongated rod through the second link so that the first end of the rod is substantially coplanar with an outer surface of the first link; and (ix) affixing the first end of the rod to the outer surface of the first link and the second end of the rod to the outer surface of the second link.

In another aspect, step (ix) entails welding the first end of the rod to the outer surface of the first link and the second end of the rod to the outer surface of the second link.

In another aspect, step (vi) entails driving the rod through the first link with a first piston and step (vii) entails driving the rod through the second link with a second piston.

In another aspect, at least one of the first piston and the second piston is pneumatic.

In another aspect, the method includes the additional step of (x) positioning the rod so that the second end of the rod is substantially coplanar with an outer surface of the second link.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
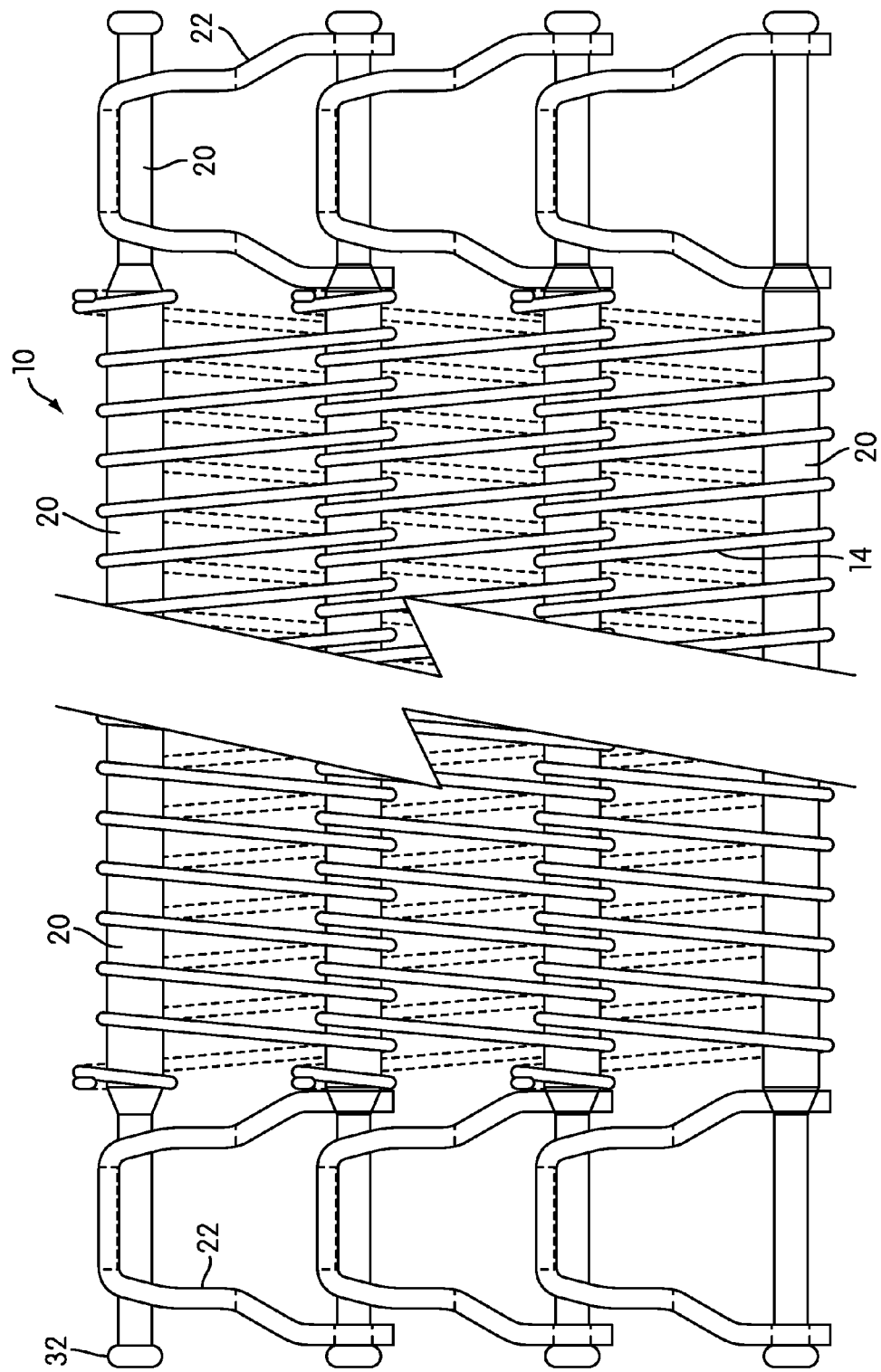
FIG. 1 is a schematic view of a prior art conveyor belt incorporating rods with buttonheads.
Figure 2:
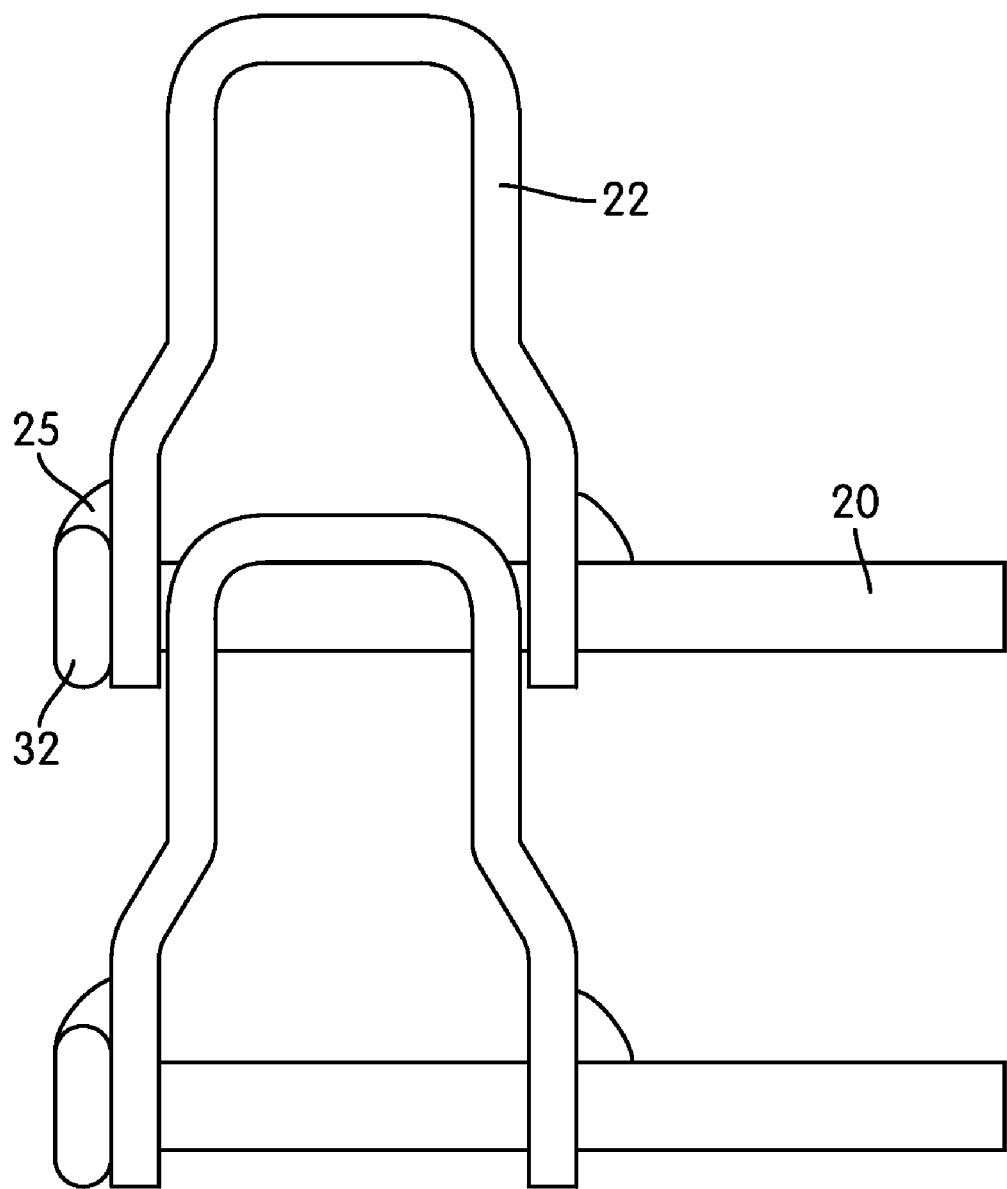
FIG. 2 is a schematic view of a link of a prior art conveyor belt link on a buttonhead rod.

FIG. 1 shows a prior art conveyor belt 10 formed from rods 20 connected together with links 22 as disclosed in U.S. Pat. No. 5,954,188. A wire mesh overlay 14 covers rods 20 between links 22 to provide additional support for the goods transported on conveyor belt 10. As shown in FIG. 2, which shows an enlarged view of a portion of conveyor belt 10, rods 20 are formed with buttonheads 32. Buttonheads 32 assist in keeping links 22 in position. Rods 20 are connected to links 22 via buttonheads 32, such as with welds 25.

Figure 3:
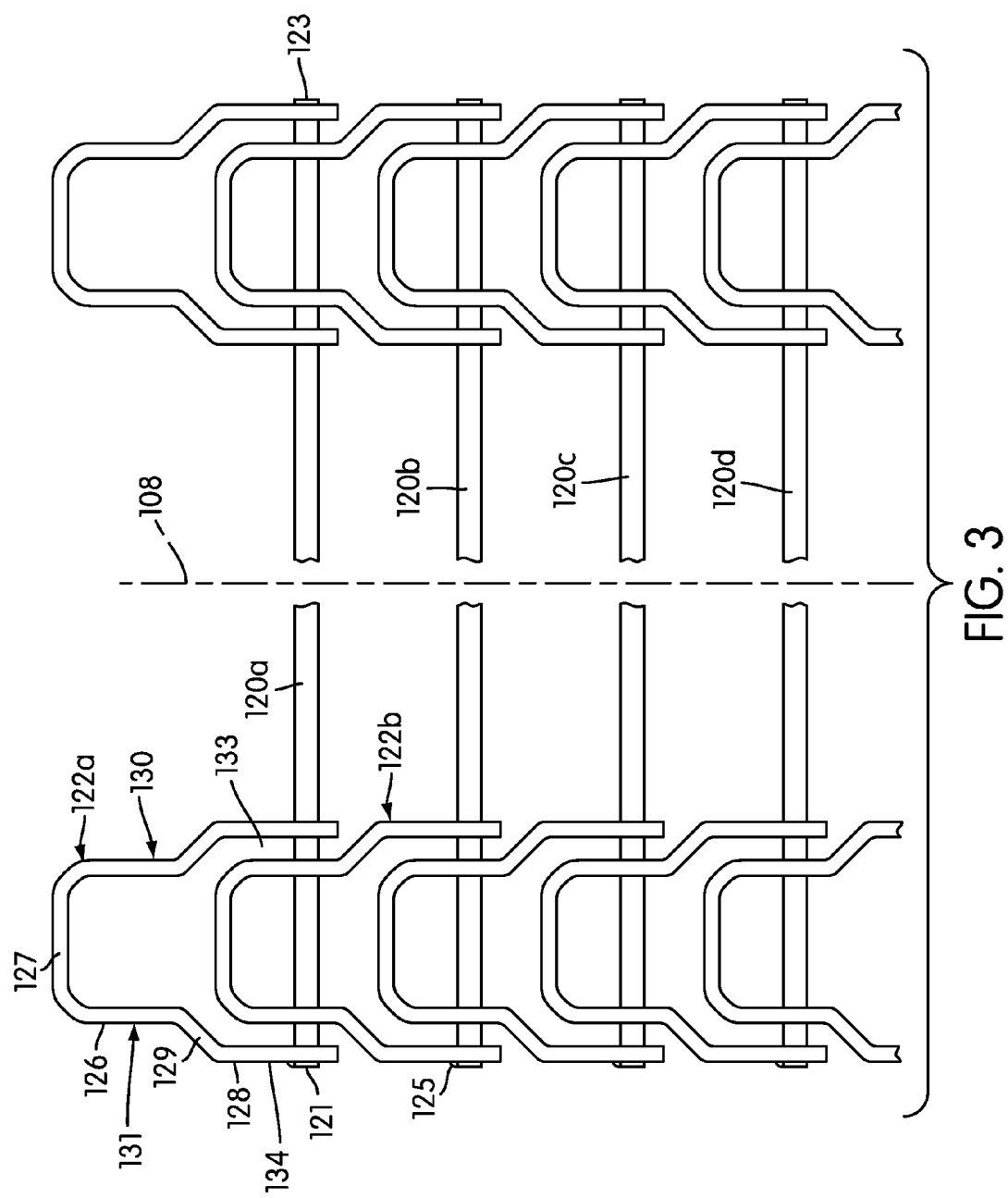
FIG. 3 is a schematic top view of a conveyor belt incorporating buttonless rods according to the invention.

FIG. 3 shows a top view of a conveyor belt 110 of the present invention made with a plurality of elongated buttonless rods 120a-d. In the context of this application, the term "buttonless" refers to rods without a bulbous protrusion formed on each end. However, "buttonless" does not preclude the possibility that a small stepped area could overlay the link aperture so that the small stepped area is substantially coplanar with an outer surface 134 of link 122. All rods 120 are substantially similar in shape and dimension, with each rod 120a-d being an elongated cylindrical body. Each rod 120 includes a first end 121 and a second end 123. Preferably, in this embodiment, rods 120 have a uniform or substantially uniform diameter along the length of the cylindrical body, with the diameter selected based upon many factors, such as the type of goods being moved on conveyor belt 110, the width of conveyor belt, etc. In other embodiments, rods 120 may include tapering or stepped configurations, such as those disclosed in the '188 patent. Rods 120 are preferably made from a metal material, such as steel or stainless steel.

Rods 120 are connected to each other with connective links 122. Preferably, connective links 122 have a general U-shape, with each connective link 122 constructed with two mirror-image legs, inner leg 130 and outer leg 131 joined by a top bar 127. As the configuration of inner leg 130 and outer leg 131 are identical save for opposing orientation, for the sake of clarity, only the structure of outer leg 131 is discussed with particularity. Outer leg 131 preferably includes a relatively straight upper portion 126 connected by an outwardly-tapering transition region 129 to a relatively straight lower portion 128. This configuration creates a wider lower opening 133 to allow for the interconnection of links 122, as top bar 127 of one link 122 may readily slide into a nesting relationship with lower portion 133 of an adjacent link.

Figure 4:
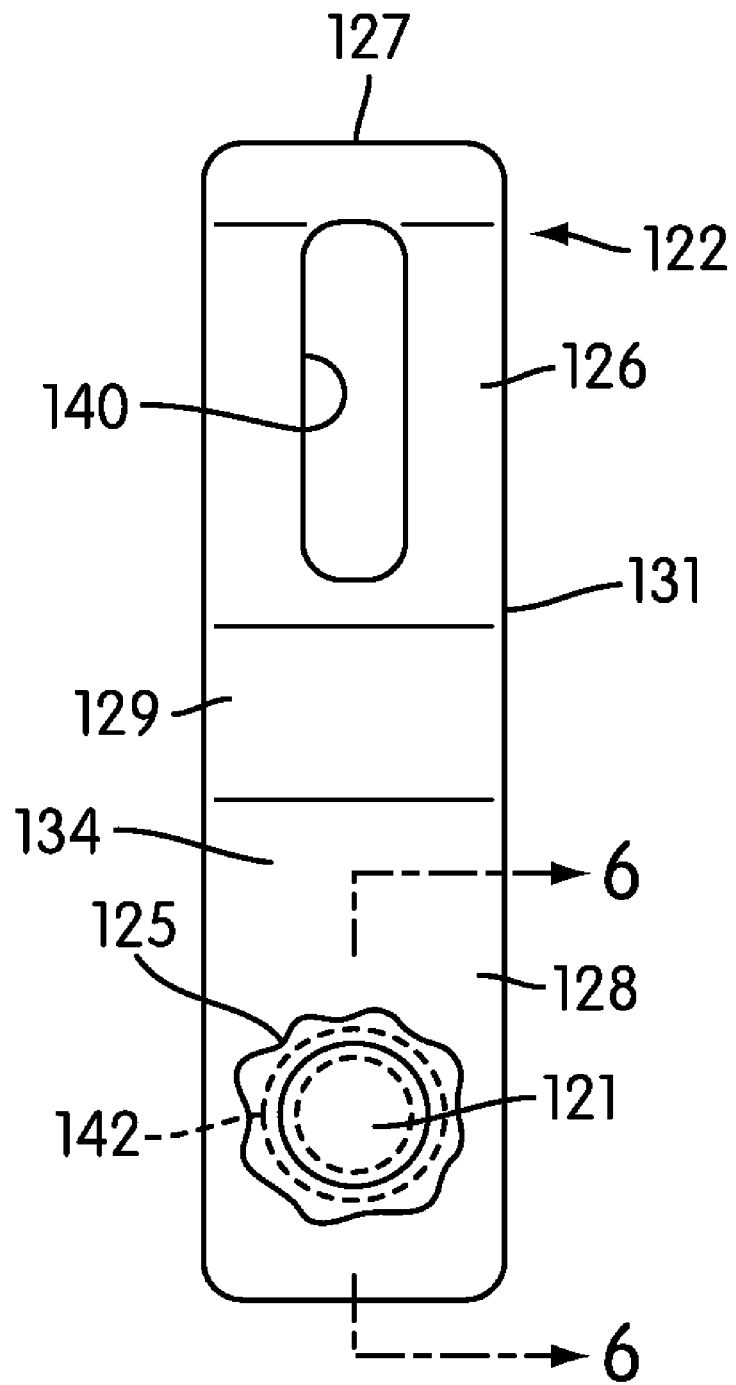
FIG. 4 is a schematic side view of a link of conveyor belt showing the buttonless end of a rod.

Outer leg 131 also includes two apertures to receive rod 120. For example, as shown in FIG. 4, outer leg 131 is provided with a generally circular aperture 142 situated in lower portion 128 and with an elongated aperture 140 formed in upper portion 126. Starting from a center line 108 of conveyor belt 110 (shown in FIG. 3), rod 120 passes through a circular aperture 142 on an inner leg 130 of a first link, both elongated apertures 140 of a second link and then through the second circular aperture 142 of outer leg 131 of the first link. A rod end 121 is then welded directly to an outer surface 134 of the adjacent link in the vicinity of circular aperture 142. No buttonhead is formed on rod end 121 prior to welding rod end 121 to outer surface 134. Rod end 121 is preferably covered by the resulting weld 125.

For example, as shown in FIG. 3, moving to the left from center line 108, rod 120a passes first through link 122a and then through link 122b. A rod end 121 is then welded or otherwise affixed to an outer surface 134 of link 122a. As such, rod 120a is fixedly attached to link 122a so that the movement of rod 120a also moves link 122a. However, rod 120a is not fixedly attached to link 122b, but merely rests within elongated aperture 140 of link 122b. Therefore, rod 120a may translate within elongated aperture 140. This translation increases the degrees of freedom of movement of conveyor belt 110, because conveyor belt 110 may stretch, contract, or yaw by lengthening or shortening either or both sides of conveyor belt 110 as rods 120 move within elongated apertures 140. Such motion allows, for example, conveyor belt 110 to travel around a bend.

Figure 5:
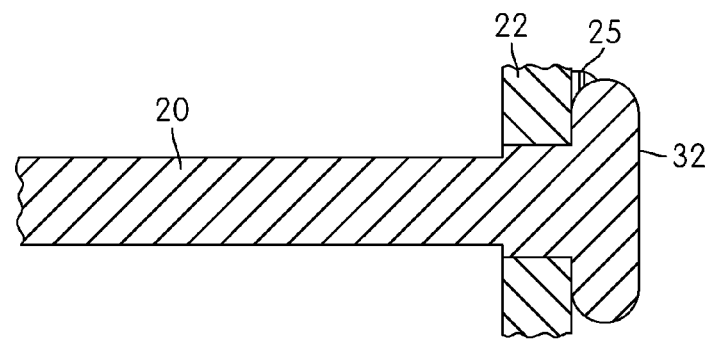
FIG. 5 is a schematic cross-sectional view of an end of a prior art conveyor belt rod, showing the buttonhead.
Figure 9:
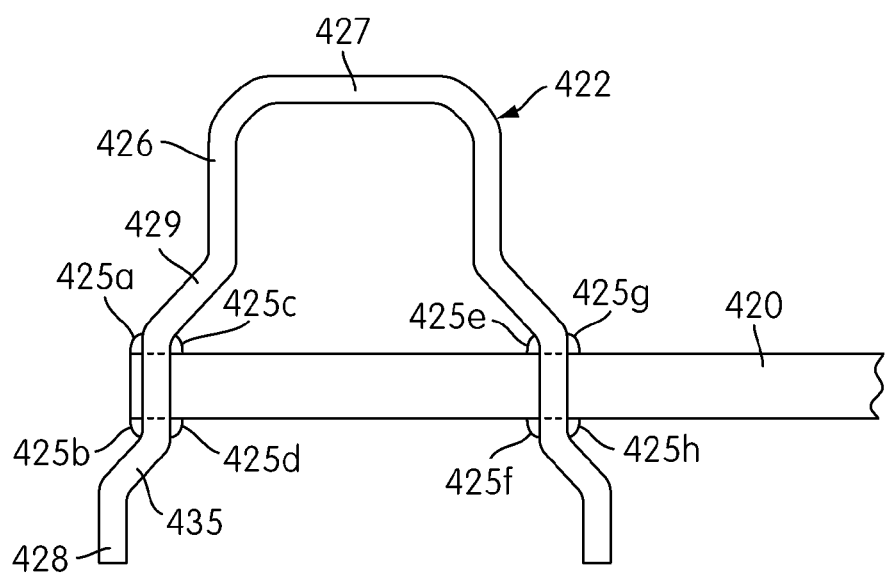
FIG. 9 is a schematic top view of an alternate embodiment of a link of a buttonless conveyor belt, showing various rod-to-link weld locations.

As shown in FIG. 5, in the prior art a rod 20 including a buttonhead 32 protrudes from link 22 so that buttonhead 32 may be formed from the end of the rod, such as by melting the end of rod 20 with an electrode. Once formed, buttonhead 32 is cleaned of any carbon residue generated by the buttonhead forming process, such as by dipping buttonhead 32 in an acid bath. After buttonhead 32 is cleaned, buttonhead 32 is welded to link at weld point 25 or in multiple weld points, as shown in FIG. 9 and discussed below.

Figure 6:
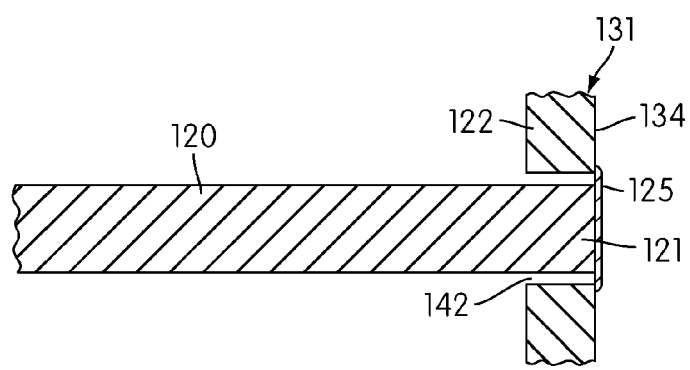
FIG. 6 is a schematic cross-sectional view of an end of a conveyor belt rod according to the invention, with the end of the rod substantially flush with an outer wall of the link.
Figure 7:
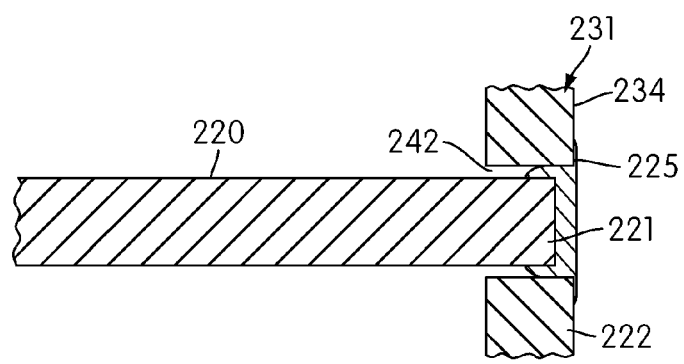
FIG. 7 is a schematic cross-sectional view of an end of another embodiment of a buttonless conveyor belt rod according to the invention, with the end of the rod recessed within the leg of the link.
Figure 8:
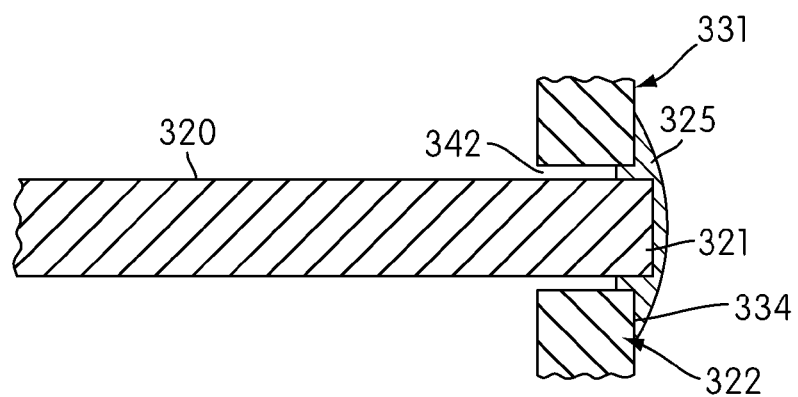
FIG. 8 is a schematic cross-sectional view of an end of another embodiment of a buttonless conveyor belt rod according to the invention, with the end of the rod protruding from the leg of the link.

However, in the present invention, as no buttonheads are included on the rods, the ends of the rods need not protrude from legs of links. Instead, the ends of the rods are substantially coplanar with an outer surface 134 of an outer leg 131 of the link. In one embodiment, as shown in FIG. 6 which is a cross-sectional view of rod 120 and link 122 taken along line 6-6 of FIG. 4, rod end 121 is flush or coplanar with an outer surface 134 of outer leg 131 of link 122 after insertion into circular aperture 142. In FIGS. 6-8, the gap between link 122 and rod 120 in circular aperture 142 is exaggerated for clarity during discussion. In manufacture, this gap is preferably smaller, for example, with contact between rod 120 and link 122 within circular aperture 142 on at least a portion of the circumferential perimeter of rod 120.

In this embodiment, weld 125 is formed over the entire surface of rod end 121, although in other embodiments, weld 125 may cover only a portion of rod end 121. Weld 125 may be formed by melting rod end 121, by applying additional weld material to rod end 121, or a combination of these techniques. Because rod end 121 is coplanar with outer surface of link 122, outer surface 134 of outer leg 131 of link 122 is relatively smooth. This smoothness prevents the accumulation of debris on link 122, decreases the difficulty of cleaning link 122, and decreases wear and tear on components which come into contact with outer surface 134 of outer leg 131 of link 122. Such components include, for example, grip members of drivers which frictionally grasp outer surface 134 of link 122 to drive conveyor belt 110, such as to move conveyor belt 110 around a bend, and stationary components of conveyor systems which contact outer surface 134, such as portions of a drum used as a guide.

In another embodiment, shown in FIG. 7, a rod 220 is inserted into a circular aperture 242 of a link 222 so that a rod end 221 is substantially coplanar with outer surface 234 of link 222. In this embodiment, rod end 221 is slightly recessed within link 122, with a weld 225 formed over the entirety of rod end 221. Preferably, weld 225 is preferably formed with additional weld material so that weld material may also fill a portion of circular aperture 242 to provide a smooth outer surface 234.

In another embodiment, shown in FIG. 8, a rod 320 is inserted into a circular aperture 342 of a link 322 so that a rod end 321 is substantially coplanar with outer surface 334 of link 322. In this embodiment, rod end 321 protrudes slightly from link 322, although not as significantly as prior art rod ends used to form buttonheads, as shown in FIG. 4. Rod end 321 is preferably entirely covered with a weld 325, which is preferably formed by melting rod end 321 to link 322, but which also may be formed using additional weld material. In this embodiment, the formation of weld 325 does not form a buttonhead, even though rod end 321 may be melted to form the connection between rod 320 and link 322. Instead, any melting of rod end 321 is performed to flatten and smooth rod end 321 so that outer surface 334 of link 322 may be as smooth as possible to decrease wear on a driving surface, and to prevent the accumulation of debris on link 322 and to decrease the difficulty of cleaning link 322. Preferably, the gap between link 322 and rod 320 is at least partially filled with material, either melted rod material or additional weld material. In one embodiment, the gap is about 20% to about 50% filled. In other embodiments, the gap is completely or substantially completely filled. In yet other embodiments, the gap is not filled at all.

The connective links joining together the buttonless rods are not limited in configuration to those shown above. The configuration of the connective links may be simpler than link 122 shown above, for example where each leg of the link includes a single straight portion. Alternatively, the configuration of the connective link may be more involved for certain applications. For example, as shown in FIG. 9 a connective link 422 is shown. Connective link 422 includes an inner leg 430 and an outer leg 431 connected by a top bar 427. Inner leg 430 and outer leg 431 are mirror images of each other to provide symmetry for link 422, although in other embodiments, link 422 may be asymmetrical. Connective link 422 is further described in European patent application publication EP 1498367 A1, which is incorporated herein by reference.

FIG. 9 also shows various locations for welding link 422 to rod 420. In addition to or instead of the welds that completely cover a rod end, such as weld 125 shown in FIG. 4, link 422 may be welded to rod 420 in several locations. For example, first weld 425a is positioned on rod 420 and outer surface of outer leg 431 at or near the point at which first transition portion 429a meets middle portion 434a. Second weld 425b is formed on rod 420 and outer surface of outer leg 431 at or near the point at which second transition portion 435a meets middle portion 434a. Complementary welds are formed in the same general positions as first weld 425a and second weld 425b, but on the opposite side of outer leg 431. Third weld 425c is formed on rod 420 and an inner surface of outer leg 431 at or near the point at which first transition portion 429a meets middle portion 343a. Fourth weld 425d is formed on rod 420 and inner surface of outer leg 431 at or near the point at which second transition portion 435a meets middle portion 434a.

Inner leg 430 includes similar welds at similar positions as those described for outer leg 431: a fifth weld 425e corresponding to third weld 425c; a sixth weld 425f corresponding to fourth weld 425d; a seventh weld 425g corresponding to first weld 425a; and an eighth weld 425h corresponding to second weld 425b. Any of welds 425a-h may optionally be included on any link of a conveyor belt such as conveyor belt 110 shown in FIG. 3. In configurations such as those shown in FIG. 5, where rod end 121 is entirely covered by a single weld 125, any combination of third through eighth welds 425c-h may optionally be included. Additional welds increase the strength of the conveyor belt, which may be desired, depending upon the intended use of the conveyor belt.

To make a conveyor belt without buttonheads, such as conveyor belt 110 as described above, links such as those described above are provided on either side of a rod on a manufacturing surface 550. The links are preferably secured in a mechanism which can both hold the link in position and assure the orientation of the link, such as a magazine, guide rails fed by an orientation-selecting hopper, or the like. The manufacturing surface 550 is preferably a flat or relatively flat horizontal surface, such as a table, or a series of split flat or relatively flat horizontal surfaces, such as the rails of a machine. However, in other embodiments, the surface may be vertical, a combination of horizontal and vertical surfaces, or curved surfaces.

During manufacture, rod 520 is advanced in a manufacturing direction, which is defined to be the direction in which rod 520 is moved in order to perform an additional processing step. For example, the manufacturing direction may be horizontally along the manufacturing surface 550. Rod 520 may be moved by any mechanism known in the art, such as via a clip secured to a driven belt or chain (not shown) or by the force of additional rods being fed onto the manufacturing surface 550 following rod 520.

Figure 10:
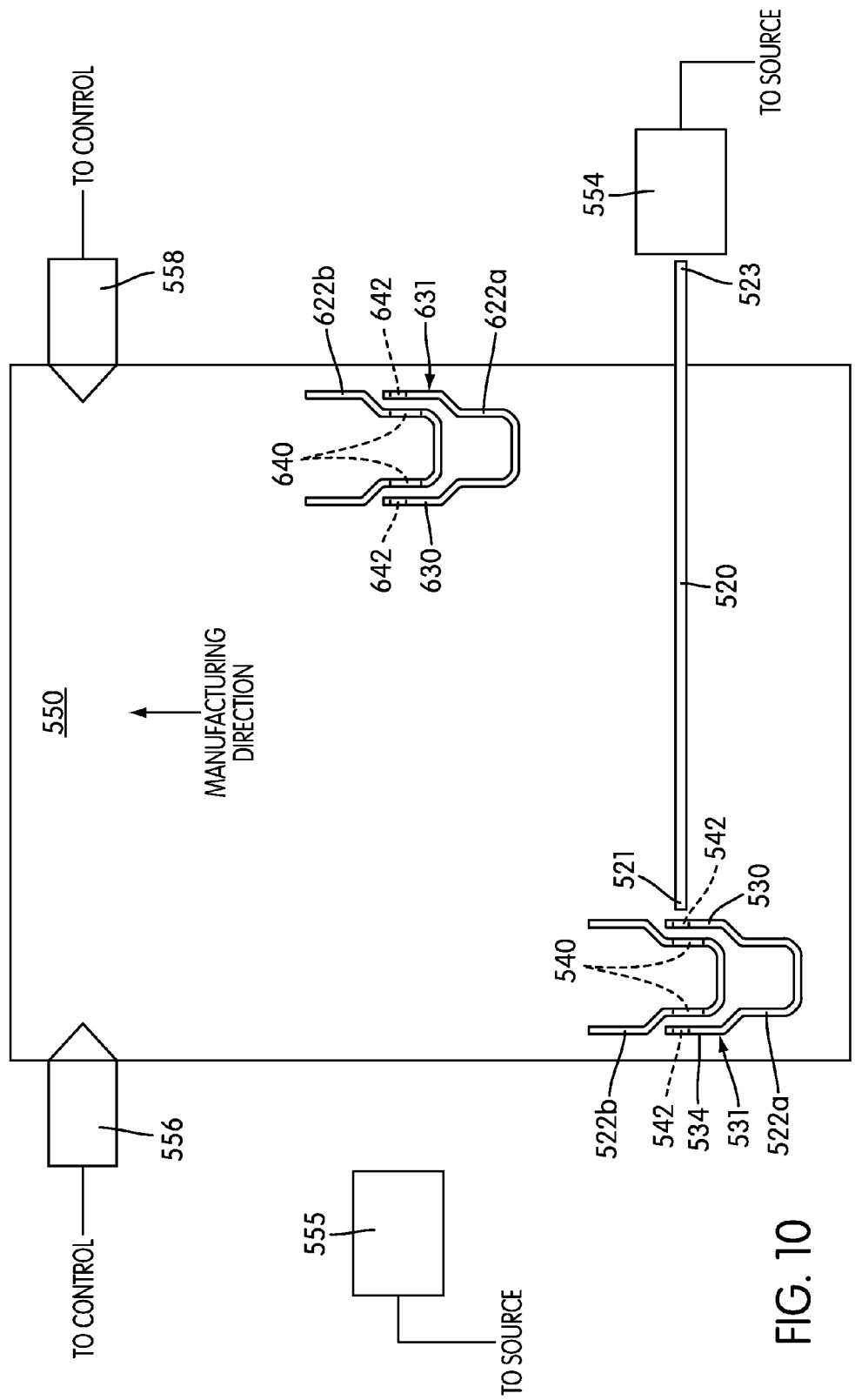
FIG. 10 shows a schematic view of a first step in manufacturing a buttonless conveyor belt.

Preferably, as shown in FIG. 10, the links on one side of rod 520 are offset in the direction of manufacturing from the links on the other side of rod 520, so that rod encounters the links on one side of rod 520 prior to the links on the other side of rod 520. In one embodiment, the first link 522a is encountered on the left side of rod 520, with the link on the right side of rod 520 offset in the direction of manufacturing. However, in other embodiments, the first link 522a will be on the right side of rod 520. In such an embodiment, the motion of rod 520 will oppose the motion of rod 520 as described below, which assumes that the first link 522a is on the left side of rod 520.

As manufacturing commences, first link 522a is positioned to receive rod 520 on the left side of the manufacturing surface 550. A second link 522b is positioned adjacent to the first link 522a so that the elongated apertures 540 of the second link 522b are aligned with the circular apertures 542 of the first link 522a. Rod 520 is preferably centered on the manufacturing surface 550 and advanced toward the links. As first link 522a is positioned on the left side of rod 520, rod 520 may alternatively be shifted slightly toward the right side of the manufacturing surface 550.

Figure 11:
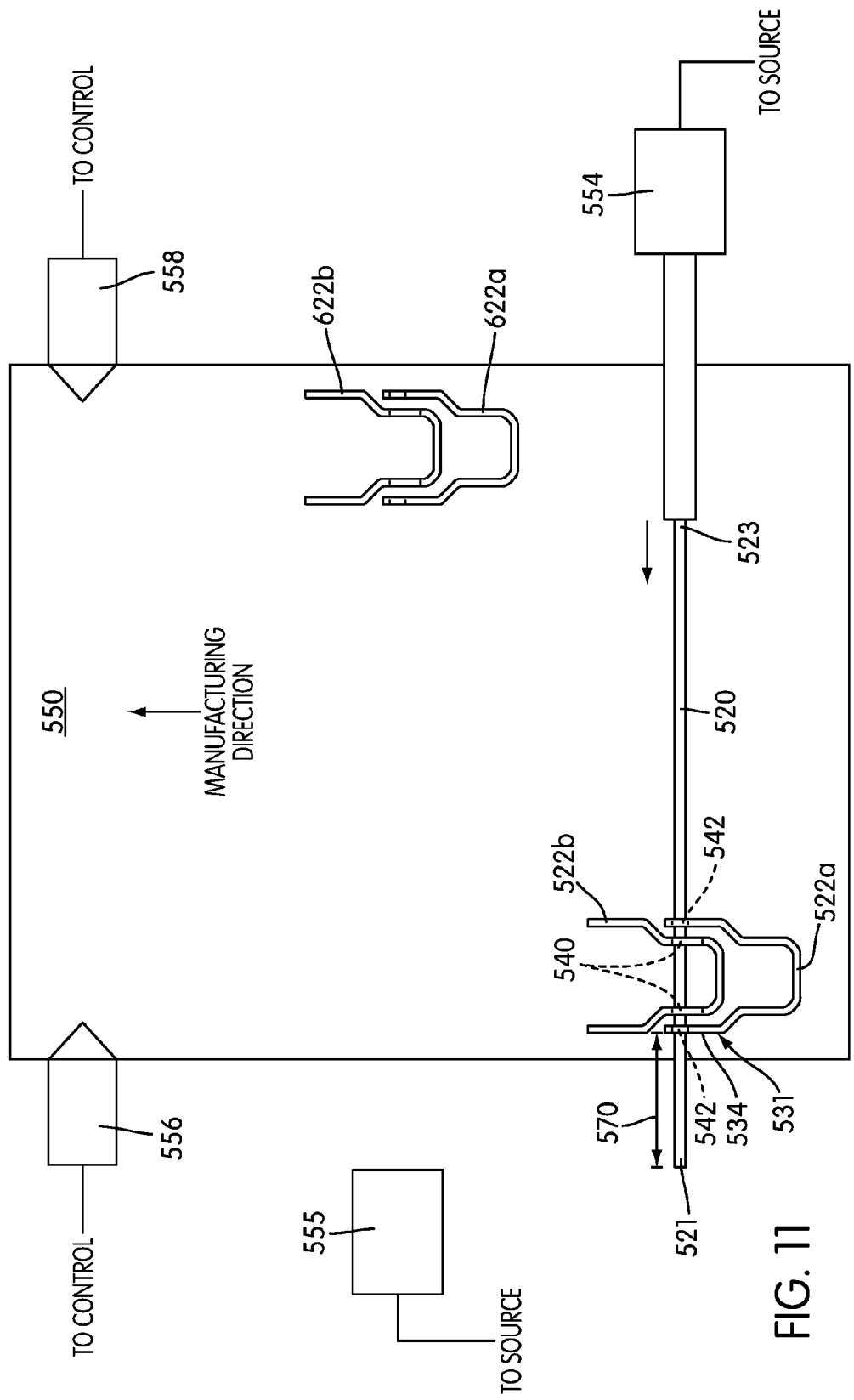
FIG. 11 shows a schematic view of a second step in manufacturing a buttonless conveyor belt.

In the next step of manufacturing, as shown in FIG. 11, a shifting mechanism 554, such as a pneumatic or hydraulic driven piston, pushes on second end 523 of rod 520. Rod 520 moves toward the left side of the manufacturing surface 550, as indicated by the arrow, and is fed through circular apertures 542 of the first link 522a and elongated apertures 540 of the second link 522b to connect the first and second link 522a, 522b. Rod 520 is pushed through links 522a, 522b so that a portion 570 of rod 520 protrudes through away from an outer surface 534 of an outer leg 531 of first link 522a. As such, rod 520 is shifted toward the left side of the manufacturing surface 550 so that there is sufficient clearance of between the right side edge of rod 520 and the links positioned on the right side of the manufacturing surface 550.

Figure 12:
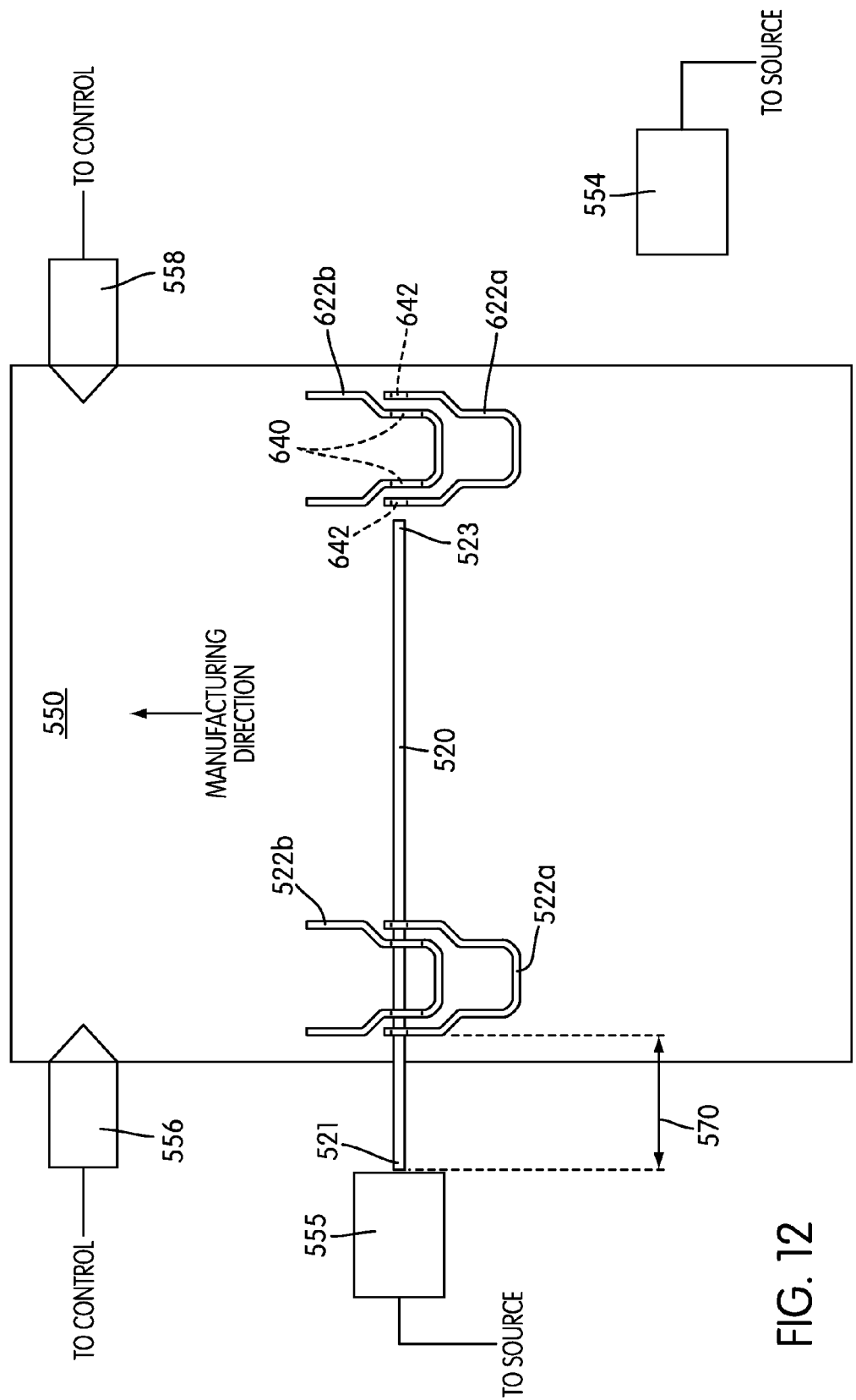
FIG. 12 shows a schematic view of a third step in manufacturing a buttonless conveyor belt.

As shown in FIG. 12, rod 520 and links 522a, 522b are advanced in the manufacturing direction to the next process station. A third link 622a is positioned to receive rod 520 on the right side of the manufacturing surface 550. As with the links on the left side of the manufacturing surface 550, a fourth link 622b is positioned adjacent to the third link 622a so that the elongated apertures 640 of fourth link 622b are aligned with the circular apertures 642 of the third link 622a.

Figure 13:
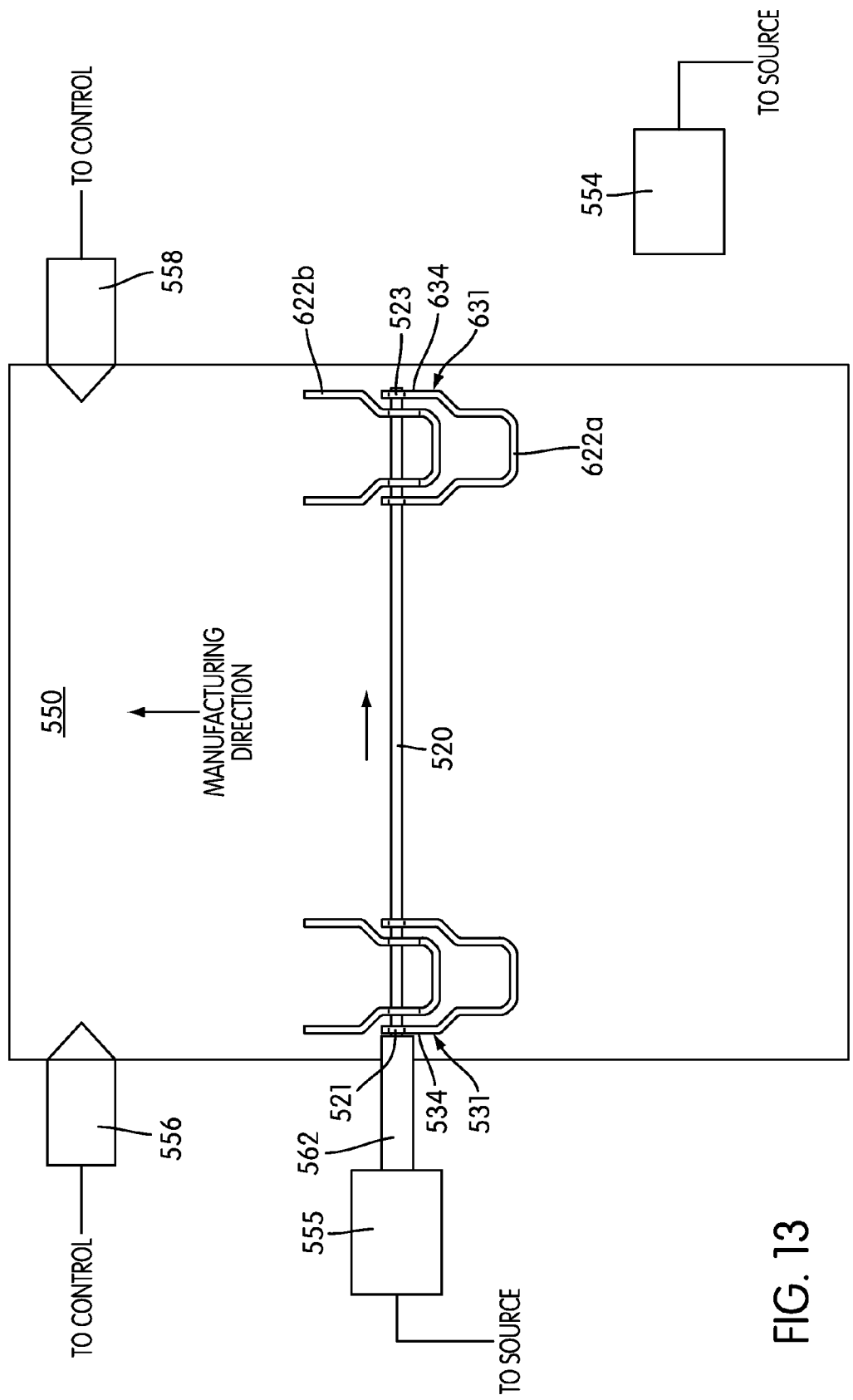
FIG. 13 shows a schematic view of a first step in manufacturing a buttonless conveyor belt.

As shown in FIG. 13, rod 520 is then advanced toward the links positioned on the right side of the manufacturing surface 550 and aligned with the circular apertures 642 of the third link 622a. A second shifting mechanism 555, such as a second driven piston positioned on the left side of the manufacturing surface 550, pushes rod 520 toward the right side of the manufacturing surface 550, as indicated by the arrow. Rod 520 is thus fed through circular apertures 642 of the third link 622a and the elongated apertures 640 of fourth link 622b so as to connect the third and fourth links 622a, 622b. Rod 520 is only pushed toward the right side of the manufacturing surface 550 sufficiently far as to connect the third and fourth link 622a, 622b but no so far as to disengage rod 520 from the first and second link 522a, 522b. Preferably, rod 520 is now centered on the manufacturing surface 550, with first rod end 521 flush with outer surface 534 of the outer leg 531 of first link 522a and second rod end 523 flush with outer surface 634 of outer leg 631 of second link 622a. In other embodiments, rod ends 521, 523 may be slightly recessed within outer legs 531, 631 of the first link 522a and third link 622a, respectively, or slightly protruding from first link 522a and third link 622a.

In a final step, which is not shown, rod 520 and links 522a, 522b, 622a, and 622b are advanced again to welding stations 556, 558 situated on both sides of the manufacturing surface 550. Welding stations 556, 558 preferably include welding electrodes, such as those of a plasma welding machine or any other type of welding machine, connected to a welding control center, and, optionally, a feeder for weld material. Rod ends are aligned with the welding electrodes 556, 558, which supply energy sufficient to melt rod ends to the outer surfaces 534, 634 of first link 522a and third link 622a, respectively, to secure rod 520 to the links in the vicinity of the circular apertures. In other embodiments, additional weld material is applied to the interface of rod end and the outer surface of the link and melted by the welding electrodes to secure rod end to the outer surface of the link. Weld material may cover only a portion of rod end or may cover the entire outer surface of rod end. Both ends of rod 520 may be welded to the links simultaneously, or the welding may be done sequentially.

In some embodiments, the welding electrodes are mounted to the manufacturing surface in a stationary fashion, so that the welding electrodes are positioned in relation to the links so that the rod may be welded to the link on the outer surface of the outer legs of the links. In other embodiments, however, the welding electrodes are movably mounted to the manufacturing surface so that the welding electrodes may apply energy to multiple locations on the links, such as those locations shown in FIG. 9, including on the inner legs of the links.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A conveyor belt including spaced apart elongated rods joined together by interlocking links, the conveyor belt comprising:
a first link having a first inner leg and a first outer leg;
a second link having a second inner leg and a second outer leg;
the first link and the second link spaced apart and positioned so that the first inner leg faces the second inner leg;
the first outer leg having a first inner surface that faces the first inner leg and a first outer surface opposite to the first inner surface;
the second outer leg having a second inner surface that faces the second inner leg and a second outer surface opposite to the second inner surface;
the first outer leg having a first circular aperture extending entirely through the first outer leg;
the second outer leg having a second circular aperture extending entirely through the second outer leg;
a rod having a body, a first free end and a second free end, wherein the first free end and the second free end have the same diameter as the body;
the first free end disposed in the first circular aperture;
the second free end disposed in the second circular aperture;
a first weld attaching the first free end to the first outer surface, wherein the first weld covers the first free end, wherein the first free end is coplanar with the first outer surface of the first link;
wherein the first weld has a first irregular shape;
wherein the second free end is attached to the second outer surface with a second weld, wherein the second weld covers the second free end, wherein the second free end is coplanar with the second outer surface of the second link; and
wherein the second weld has a second irregular shape.

2. The conveyor belt of claim 1, wherein the first weld has a first outer weld surface that is coplanar with the first outer surface.

3. The conveyor belt of claim 1, wherein the second weld has a second outer weld surface that is coplanar with the second outer surface.

4. The conveyor belt of claim 1, wherein the first link and the second link each have side-to-side symmetry.

5. A conveyor belt comprising:
a plurality of spaced apart rods;
each rod being a solid elongated member;
a plurality of links connecting the rods;
each link having an inner leg connected to an outer leg;
a first rod free end received by a circular aperture formed entirely through the outer leg of a first link, said first rod free end positioned flush with an outer surface of the first link, and the first rod free end affixed to the outer surface of the first link with a weld;
wherein the weld is formed entirely over the first rod free end, and an outer surface of the weld is flush with the outer surface of the link; and
wherein the first rod end is recessed within the circular aperture of the link.

6. The conveyor belt of claim 5, wherein each link is configured to receive a second rod end of a second rod through an elongated aperture formed in the link.

7. The conveyor belt of claim 5, wherein the plurality of links are generally U-shaped.

8. The conveyor belt of claim 5, wherein each link has an inner leg and an outer leg joined by a top bar, and wherein the circular aperture is disposed in the outer leg.

9. The conveyor belt of claim 5, wherein additional weld material is applied to the first rod end and the outer surface of the link to secure the first rod end to the link.

10. The conveyor belt of claim 5, wherein the first rod end includes a melted portion, wherein the melted portion secures the first rod end to the link.

11. The conveyor belt of claim 5, wherein the weld has an irregular shape.

12. The conveyor belt of claim 5, wherein additional weld material surrounds the first rod free end within the circular aperture.

13. A conveyor belt comprising:
a plurality of spaced apart buttonless rods;
a first plurality of links connecting the buttonless rods, each link configured to receive a first rod free end of a first rod through a first circular aperture formed in the link;
the first rod free end being affixed to an outer surface of the link with a weld; and
the first rod end being coplanar with the outer surface of the link;
wherein the weld is formed proximate the first circular aperture, wherein the weld is formed around the entirety of a perimeter of the first rod free end, wherein a surface of the weld is flush with the outer surface of the link, and wherein additional weld material is applied to the first rod end and the outer surface of the link to secure the first rod end to the link; and
wherein a gap is disposed between the first rod end and the link, and wherein the gap is filled by the additional weld material so that an outer surface of the additional weld material is flush with the outer surface of the link.

14. A conveyor belt comprising:
a plurality of spaced apart buttonless rods;
a first plurality of links connecting the buttonless rods, each link configured to receive a first rod free end of a first rod through a first circular aperture formed in the link;
the first rod free end being affixed to an outer surface of the link with a weld; and
the first rod end being coplanar with the outer surface of the link;
wherein the weld is formed proximate the first circular aperture, wherein the weld is formed around the entirety of a perimeter of the first rod free end, wherein a surface of the weld is flush with the outer surface of the link, and wherein additional weld material is applied to the first rod end and the outer surface of the link to secure the first rod end to the link; and
wherein a gap is disposed between the first rod end and the link, and wherein the gap contains the additional weld material so that the additional weld material fills between about 20 percent and about 50 percent of the gap.

15. A conveyor belt comprising:
a plurality of spaced apart buttonless rods;
a first plurality of links connecting the buttonless rods, each link configured to receive a first rod free end of a first rod through a first circular aperture formed in the link;

the first rod free end being affixed to an outer surface of the link with a weld; and the first rod end being coplanar with the outer surface of the link;

wherein the weld is formed proximate the first circular aperture, wherein the weld is formed around the entirety of a perimeter of the first rod free end, wherein a surface of the weld is flush with the outer surface of the link, and wherein additional weld material is applied to the first rod end and the outer surface of the link to secure the first rod end to the link; and wherein each link of the first plurality of links includes a second circular aperture extending laterally through the link such that an adjacently spaced rod extends pivotally through said second aperture to connect the plurality of spaced apart rods.

16. The conveyor belt of claim 15, further including a second plurality of links connecting the rods and positioned on the second end of each rod.

17. The conveyor belt of claim 16, wherein each link of the plurality of links are a generally U-shaped member comprising an inner leg and an outer leg.

18. The conveyor belt of claim 17, wherein the second aperture extends through the inner and outer leg of each link and is a longitudinal slot to slidably receive the adjacently spaced rod to permit adjacent links to collapse and expand with respect to each other.

19. The conveyor belt of claim 18, wherein the generally U-shaped member has a closed end and an open end wider than the closed end, the closed end of an adjacent link being received in partially nested relationship within the open end of a respective adjacent link.

20. The conveyor belt of claim 15, wherein the first end of each rod is melted to form the weld to affix the link to the respective rod.

21. The conveyor belt of claim 15, wherein the link is melted to form the weld to affix the link to the respective rod.

22. The conveyor belt of claim 15, wherein additional welding material is provided to form the weld to affix the link to the respective rod.

23. The conveyor belt of claim 15, wherein a supplemental weld is provided on the opposing inner surface of each link to further affix the link to the respective rod.

24. The conveyor belt of claim 15, wherein the weld is disposed at least around a portion of the periphery of the rod end.

25. The conveyor belt of claim 24, wherein the weld is disposed around an entire periphery of the rod end.

26. The conveyor belt of claim 25, wherein the weld covers the end of the rod.

27. The conveyor belt of claim 15, wherein a surface of the weld is recessed below the outer surface of the link.

28. The conveyor belt of claim 15, wherein a surface of the weld is flush with the outer surface of the link.

* * * * *